(12) United States Patent
Menge et al.

(10) Patent No.: US 7,675,040 B2
(45) Date of Patent: Mar. 9, 2010

(54) RADIATION DETECTOR DEVICE (75) Inventors: Peter R. Menge, Chagrin Falls, OH (US); Brian Bacon, Bristolville, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 44 days.

(21) Appl. No.: 12/108,259

(22) Filed: Apr. 23, 2008

(65) Prior Publication Data
US 2009/0266990 A1 Oct. 29, 2009

(51) Int. Cl.
G01T 1/24 (2006.01)
(52) U.S. Cl. .................................. 250/370.15
(58) Field of Classification Search .............. 250/361 R
See application file for complete search history.

(56) References Cited

U.S. PATENT DOCUMENTS

| | | |
|---|---|---|
| 4,158,773 A | 6/1979 | Novak |
| 4,764,677 A | 8/1988 | Spurney |
| 4,900,937 A | 2/1990 | Dayton et al. |
| 4,994,673 A | 2/1991 | Perna et al. |
| 5,208,460 A * | 5/1993 | Rougeot et al. ............. 250/368 |
| 5,262,649 A | 11/1993 | Antonuk et al. |
| 5,869,836 A | 2/1999 | Linden et al. |
| 6,355,932 B1 | 3/2002 | Frederick |
| 6,359,282 B1 | 3/2002 | Sekela |
| 7,208,742 B1 | 4/2007 | Zelakiewicz et al. |
| 2003/0155515 A1 | 8/2003 | Moy et al. |
| 2007/0102647 A1 | 5/2007 | Johnson et al. |

FOREIGN PATENT DOCUMENTS

JP  01126583 A  5/1989

OTHER PUBLICATIONS

K. Kimmich et al., "Characterizing, Simulating, and Eliminating Vibration Induced Counts in Measurement While Drilling Gamma Ray Detectors," Applied Radiation and Isotopes, vol. 48, Issue 10-12, Oct.-Dec. 1997, pp. 1385-1390.
D. R. James et al., "Dielectric Strengths of New Gases and Gas Mixtures," Energy Citations Database, Jan. 1, 1978.

* cited by examiner

*Primary Examiner*—David P Porta
*Assistant Examiner*—Kiho Kim
(74) *Attorney, Agent, or Firm*—Larson Newman & Abel, LLP (57) ABSTRACT A radiation detector device can include a photosensor and a scintillation device coupled to the photosensor. The scintillation device can include a scintillator crystal enclosed within a casing. The scintillator crystal can be optically coupled to a window at an end of the casing. The scintillation device can include a dielectric gas inside at least part of the casing. The dielectric gas can be adapted to reduce or prevent static discharge within the scintillation device.

26 Claims, 5 Drawing Sheets

RADIATION DETECTOR DEVICE

FIELD OF THE DISCLOSURE

The present disclosure is directed to radiation detector devices, particularly scintillation devices for industrial applications.

BACKGROUND

Radiation detector devices are used in a variety of industrial applications. For example, scintillation detectors are used for well logging in the oil and gas industry. Typically, scintillation detectors have scintillator crystals made of an activated sodium iodide or other material that is effective for detecting gamma rays. Generally, the scintillator crystals are enclosed in casings or sleeves that include a window to permit radiation-induced scintillation light to pass out of the crystal package. The light passes to a light-sensing device such as a photomultiplier tube, and the photomultiplier tube converts the light photons emitted from the crystal into electrical pulses. The electrical pulses are shaped and digitized by associated electronics and may be registered as counts that are transmitted to analyzing equipment.

Scintillation detectors are useful for well logging, because the measurement of radiation, such as gamma rays and neutrons, allows users to analyze rock strata that surround a bore hole. Scintillation detectors can be used in drilling apparatuses themselves, giving rise to the common practice of measurement while drilling (MWD) (or logging while drilling). Nonetheless, MWD applications often take place in severe environments characterized by large amounts of heat, vibration and shock. Vibration and shock can cause the scintillator crystal, casing materials, the window, other elements of the scintillation device, or any combination thereof, to fail or otherwise malfunction.

Accordingly, the industry continues to need improvements in scintillation devices, particularly durable, ruggedized scintillation devices that can withstand the harsh environments of industrial applications.

SUMMARY

In a particular embodiment, a radiation detector device is disclosed and includes a photosensor and a scintillation device coupled to the photosensor. The scintillation device includes a scintillator crystal enclosed within a casing. The scintillator crystal is optically coupled to a window at an end of the casing. The scintillation device includes a dielectric gas inside at least part of the casing. The dielectric gas is adapted to reduce or prevent static discharge within the scintillation device.

In another embodiment, a scintillation device is disclosed and includes a scintillator crystal enclosed within a casing. The scintillator crystal is optically coupled to a window at an end of the casing. The scintillation device includes a dielectric gas inside at least part of the casing. The dielectric gas is adapted to reduce or prevent static discharge within the scintillation device.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Numerous innovative teachings of the present disclosure will be described with particular reference to exemplary embodiments. However, it should be understood that this class of embodiments provides only a few examples of the many advantageous uses of the innovative teachings herein. In general, statements made in the present disclosure do not necessarily limit any of the various claimed articles, systems or methods. Moreover, some statements may apply to some inventive features but not to others.

Figure 1:
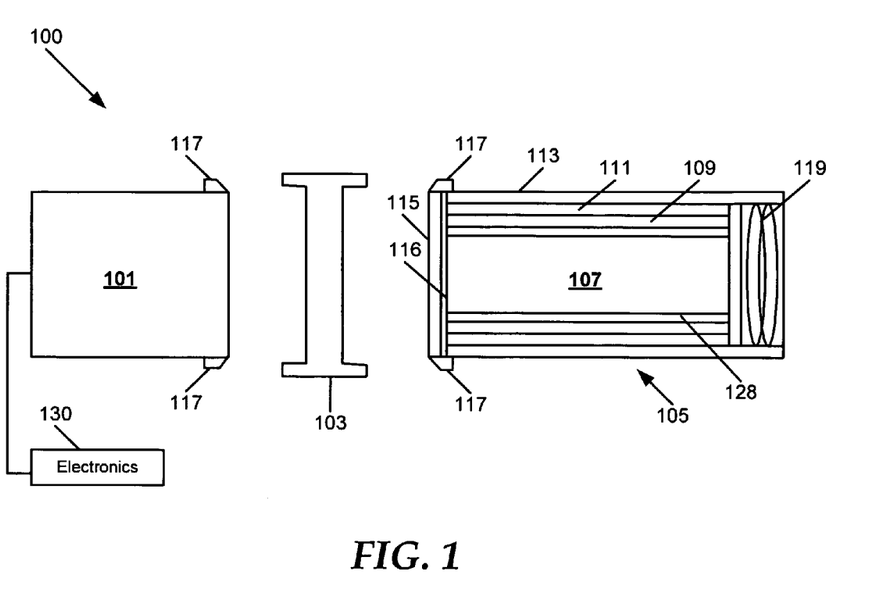
FIG. 1 is an illustration of a particular embodiment of a radiation detector device.

FIG. 1 shows a particular embodiment of a radiation detector device 100. The radiation detector device 100 includes a photosensor 101, a light pipe 103, and a scintillation device 105. Though the photosensor 101, the light pipe 103, and the scintillation device 105 are illustrated separate from each other, it is to be understood that the photosensor 101 and the scintillation device 105 are each adapted to be coupled to the light pipe 103. In one embodiment, the scintillation device 105 and the photosensor 101 can be coupled to the light pipe 103 using biasing members 117 that provide a resiliency that facilitates the absorption of shocks to the detector 100. The biasing members 117 can be used in conjunction with other known coupling methods such as the use of an optical gel or bonding agent. Further, the photosensor 101 is coupled to electronics 130 adapted to count photons received at the photosensor 101 based on electrical pulses output by the photosensor 101. The electronics 130 can include one or more electronic devices, such as an amplifier, a pre-amplifier, a discriminator, an analog-to-digital signal converter, a photon counter, another electronic device, or any combination thereof.

In one embodiment, the photosensor 101 includes a device capable of spectral detection and resolution. For example, the photosensor 101 can comprise a conventional photomultiplier tube (PMT) or a hybrid photosensor. The photosensor 101 is adapted to receive photons emitted by the scintillation device 105, other sources, or a combination thereof, and the photosensor 101 produces electrical pulses from photons that it receives. The electrical pulses can be shaped and digitized by associated electronics 130 to provide a count of the photons received at the photosensor 101. The photosensor 101 can be housed within a tube or housing made of a material capable of protecting electronics associated with the photosensor 101, such as a metal, metal alloy, other material, or any combination thereof.

As illustrated, the light pipe 103 is disposed between the photosensor 101 and the scintillation device 105 and facilitates optical coupling between the photosensor 101 and the scintillation device 105. The light pipe 103 can include a quartz light pipe, plastic light pipe, or another light pipe. In some embodiments, multiple light pipes can be disposed between the photosensor 101 and the scintillation device 105.

The scintillation device 105 includes a scintillator crystal 107 substantially surrounded by a reflector 109. In one embodiment, the reflector 109 can include polytetrafluoroethylene (PTFE) or another material adapted to reflect light emitted by the scintillator crystal 107. The reflector 109 is substantially surrounded by a shock absorbing member 111. The scintillator crystal 107, reflector 109, and the shock absorbing member 111 are housed within a casing 113. The casing 113 can include a spring 119, or other stabilization mechanism, interfaced to an end of the scintillator crystal 107 that is distal from the photosensor 101.

In addition, the casing 113 includes a window 115 interfaced to a second end of the scintillator crystal 107 that is proximal to the photosensor 101. The window 115 can include glass or another transparent or translucent material suitable to allow photons emitted by the scintillator crystal 107 and reflected by the reflector 109 to pass out of the scintillation device 105 and toward the photosensor 101. An optical interface 116 is disposed between the scintillator crystal 107 and the window 115. The optical interface 116 can comprise clear silicone rubber. In one embodiment, the optical interface is polarized to optically couple the scintillator crystal 107 to the window 115 by aligning the reflective indices of the scintillator crystal 107 and the window 115.

When silicone rubber is included in the optical interface 116, the silicone rubber typically includes long cross-linked molecules that can be polarized to optically couple the scintillator crystal 107 with the window 115. For example, the optical interface 116 can include polymerized silicone rubber having less than or equal to 1.0% mass loss under vacuum baking governed by ASTM test method E595. More preferably, the optical interface 116 can include polymerized silicone rubber having less than or equal to 0.5% mass loss under vacuum baking governed by ASTM test method E595.

An electrically insulating, or dielectric, gas 128 that is adapted to reduce or prevent static discharge by one or more elements of the scintillation device 105 is present in at least part of the casing 113. For example, the dielectric gas 128 can reduce or prevent static discharge resulting from relative movement between the scintillator crystal 107 and the optical interface 116; from relative movement between the window 115 and the optical interface 116; from relative movement between the scintillator crystal 107 and the casing 113; from relative movement between the scintillator crystal 107 and the reflector 109, from relative movement between the scintillator crystal and the shock absorbing member 111; or any combination thereof.

In one embodiment, the elements of the scintillation device 105 can be assembled in an environment of the dielectric gas 128, such that the dielectric gas 128 fills the scintillation device 105. In another embodiment, the scintillation device 105 can be assembled in an environment of argon, ambient dry air, or another gas, e.g., to prevent oxidation of the scintillator crystal 107. The scintillation device 105 can then be pumped down to vacuum and filled with the dielectric gas 128. In a further embodiment, the radiation detection device 100 can be assembled in an environment of the dielectric gas 128, such that the dielectric gas 128 can prevent or reduce static discharge resulting from movement of the photosensor 101 relative to one or more other elements of the radiation detection device 100, such as a housing surrounding the photosensor 101, the light pipe 103, or a combination thereof.

Examples of dielectric gases include sulfur hexafluoride ($SF_6$), hexafluoroethane ($C_2F_6$), dichlorodifluoromethane ($CCl_2F_2$), 1,2-dichlorotetrafluoroethane ($C_2Cl_2F_4$), perfluoro-2-butyne ($C_4F_6$), perfluorobutene-2 ($C_4F_8$), perfluorocyclobutane (c-$C_4F_8$), perfluorocyclopentene ($C_5F_8$), perfluorocyclohexene ($C_6F_{10}$), perfluorodimethylcylcobutane ($C_6F_{12}$), sulfuryl fluoride ($SO_2F_2$), perchloryl fluoride ($ClO_3F$), other gases, or any combination thereof. In some embodiments, one or more dielectric gases having a dielectric strength greater than or equal to 4 kV/mm can be mixed with one or more other gases having a dielectric strength of less than 4 kV/mm (e.g., $SF_6$ and air; $SF_6$ and $CO_2$; $SF_6$ and $N_2$).

Preferably, the dielectric gas 128 has a dielectric strength (i.e., a maximum electrical field strength that the gas can withstand without the insulating properties of the gas breaking down) of at least 4 kV/mm at standard temperature and pressure. In another embodiment, the dielectric gas 128 can be provided at a pressure greater than STP. In this embodiment, the dielectric gas 128 can include a gas having a dielectric strength below 4 kV/mm at 1 atm, but which is provided at a pressure that increases the dielectric strength of the gas to 4 kV/mm or greater. For example, the dielectric gas 128 can include air at 3 atm (having a dielectric strength of 7.4 kV/mm). TABLE 1, below, shows dielectric strengths of various gases.

TABLE 1

Dielectric Strengths of Gases

| Gas Name | Dielectric Strength at STP (kV/mm) |
|---|---|
| Argon | 1.6 |
| Nitrogen | 3.3 |
| Sulfur hexafluoride ($SF_6$) | 8.9 |
| Dichlorodifluoromethane ($CCl_2F_2$) | 8.0 |
| 1,2-dichlorotetrafluoroethane ($C_2Cl_2F_4$) | 6.9 |
| 90% $SF_6$/10% air | 12.5 |
| 90% $SF_6$/10% $CO_2$ | 10.3 |

Figure 2A:
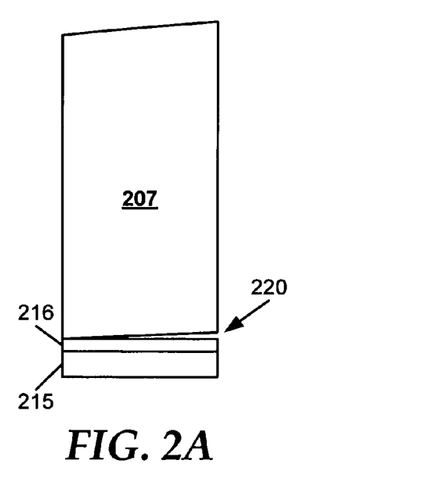
FIGS. 2A-2D are illustrations of various embodiments of aspects of radiation detector devices.
Figure 2B:
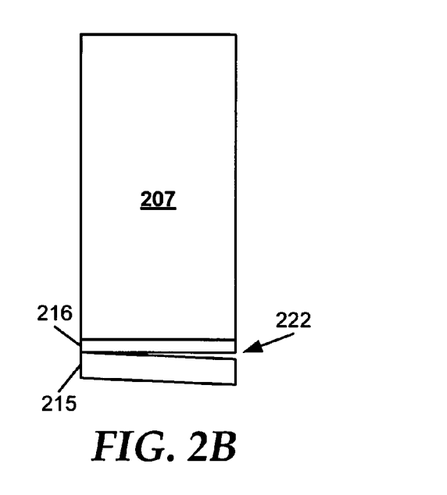

FIGS. 2A-2D show various embodiments of aspects of a radiation detector device, such as the aspects of the scintillation device 105 illustrated in FIG. 1. For instance, FIG. 2A shows a scintillator crystal 207 interfaced to a window 215 via an optical interface 217 comprising silicone rubber. The scintillator crystal 207 and the optical interface 216 can be separated for short periods of time due to vibration or shock, causing a temporary gap 220. As shown in FIG. 2B, the window 215 and the optical interface 216 can be temporarily separated due to such vibration or shock, causing another gap 222.

Figure 2C:
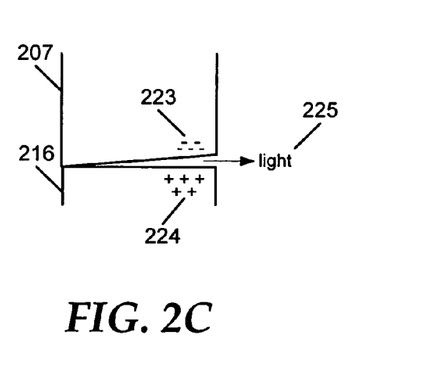

As illustrated in FIG. 2C, relative movement between the optical interface 216 and the scintillator crystal 207 (or between the optical interface 216 and the window 215) can cause one material to remove charge from the other. The resulting regions of charge 223 and 224 create an electrical potential. If relative movement continues, the electrical potential can become large enough to create a static discharge. The static discharge can produce light 225, such as visible or ultraviolet light, that is detected by a photosensor, such as the photosensor 101 illustrated in FIG. 1. The detection of the light 225 results in spurious photon counts that are difficult to distinguish from scintillation light produced by the scintillator crystal 207 in response to gamma rays or other radiation.

Figure 2D:
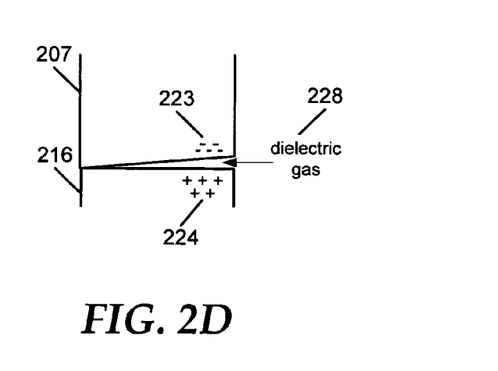

As shown in FIG. 2D, a dielectric gas 228 that fills a scintillation device can reduce or prevent static discharge by moving into gaps caused by relative movement between the optical interface 216 and the scintillator crystal 207, between the optical interface 216 and the window 215, or any combination thereof. Thus, spurious counts registered by a photosensor can be reduced or prevented by the dielectric gas 228. Those skilled in the art will appreciate that the dielectric gas 228 can reduce or prevent static discharge that may result from the development of electrical potential between the scintillator crystal 207 and other elements of a scintillation device, such as a casing, reflector, shock absorber, or any combination thereof.

Figure 3:
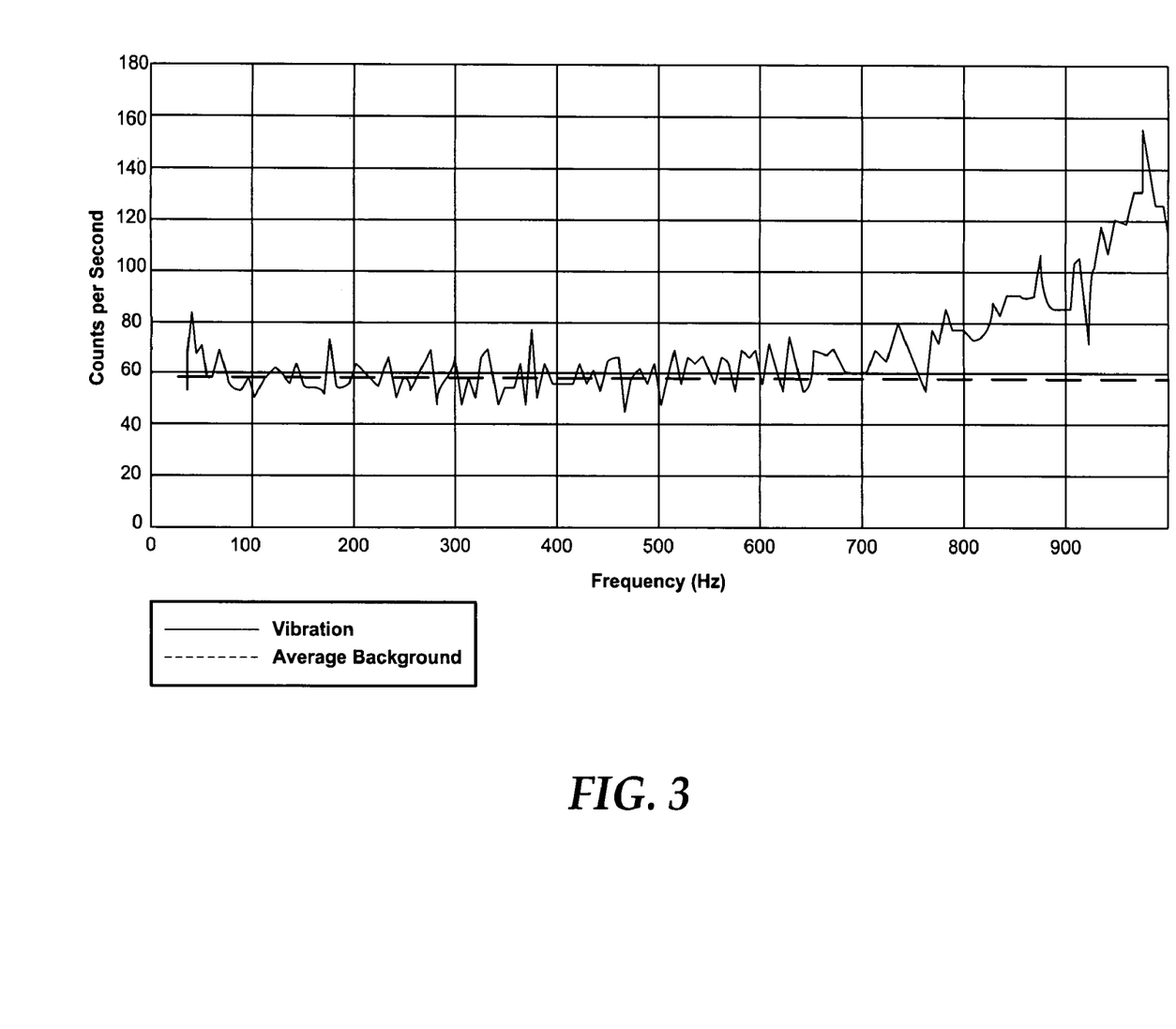
FIG. 3 is a plot illustrating numbers of counts recorded by a radiation detector device as vibration increases.
Figure 4:
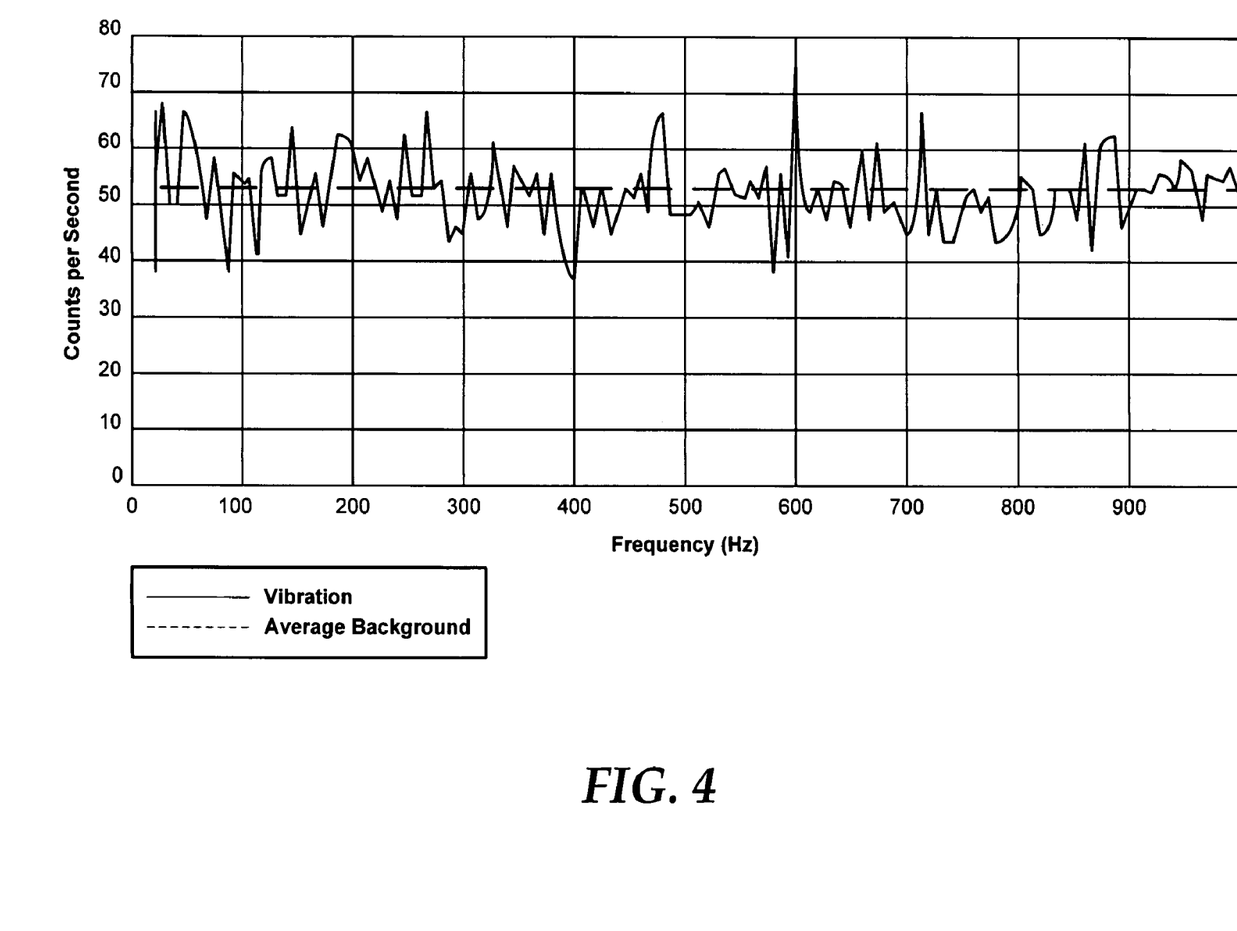
FIG. 4 is a second plot illustrating numbers of counts recorded by a radiation detector device as vibration increases.

FIGS. 3-4 show the results of vibrational testing of a radiation detector device. Testing was performed using a scintillation detector having a cylindrical NaI(Tl) crystal with a diameter of approximately 4.5 cm and a length of approximately 10 cm. The crystal was wrapped with a PTFE reflector and inserted into a ribbed silicone rubber sleeve. This crystal/PTFE/sleeve assembly was inserted in an inconel housing having an inner diameter of approximately 4.9 cm and an outer diameter of approximately 5 cm. The crystal was wetted to a glass window having a thickness of approximately 0.3 cm, using a pad of clear silicone rubber that was 0.2 cm thick. The crystal was held against the silicone rubber pad using 2 concentric springs. The unit was evacuated to a pressure of 50 mTorr, and then filled with 1 atmosphere of argon. A stainless steel end cap was welded on in the argon atmosphere to make the detector hermetic.

The detector was then subjected to a vibration test to detect spurious counts caused by static discharge between the silicone rubber pad and the crystal, or between the silicone rubber pad and the window. The detector was secured to a vibration table (Ling Dynamic Systems, model V810-240, controlled by a LDS Dactron Control). A photomultiplier tube (Hamamatsu R1288-32 at 1200 V) was optically coupled to the glass window of the detector. Signals from the photomultiplier were run through a pre-amplifier (Canberra model 2005) and then to a multichannel analyzer (Aptec model S5008) for tallying any light pulses from the scintillator that were greater than the equivalent of the light generated by a 20 keV gamma ray. The vibration table was programmed to create a sweep of vibrational frequencies 50 to 1000 Hz at a rate of 6.47 Hz/s, with a peak acceleration of 30 g (905 ft/s$^2$). The results of this test are shown in FIG. 3.

Subsequently, a hole having a diameter of approximately 0.95 cm was drilled through the end cap of the detector. The detector was placed in a vacuum chamber and evacuated to 5e-5 Torr. The chamber was then filled to 1 atmosphere pressure with SF$_6$ (Praxair, 5.5N grade). The hole was then filled with a fast setting epoxy. A new vibration test was run with the same settings as described above. The results are shown in FIG. 4.

FIG. 3 is a plot illustrating photon counts recorded by a photon counter communicating with a photosensor in a radiation detector device that includes argon gas at 1 atm, as vibration increases. The plot shows recorded photon counts per second in relation to vibrational frequencies applied to a radiation detector device. The plot shows an average background of 58.6 counts per second (cps), and an average of 69.4 cps at vibrational frequencies from 50 Hz to 1000 Hz. Hence, the counts per second recorded by the photon counter, while vibrational frequencies of 50 Hz to 1000 Hz were applied to the radiation detector device, averaged approximately 118.4% of the average background counts per second value (i.e., 69.4 cps versus 58.6 cps).

In addition, the plot shows that, as the frequency of vibration increased, particularly as the vibration surpassed approximately 780 Hz, all counts per second values recorded by the photon counter were greater than both the average background (58.6 cps) and the overall average counts per second under vibration (69.4 cps). Hence, as vibrational frequency surpassed approximately 780 Hz, spurious counts attributable to such vibration resulted in greater inaccuracies in count measurements, such that all counts per second recorded by the photon counter were greater than approximately 118.4% of the average background. Notably, counts per second experience their largest deviation from both the overall average counts per second and the average background, when the vibrational frequency is within a certain range of a resonance frequency of the radiation detector device, such as from 950 Hz to 1000 Hz. As shown, counts per second at approximately 975 Hz are greater than 250% of the average background and greater than 200% of the overall average counts per second.

FIG. 4 is a second plot illustrating photon counts recorded by a photon counter in a radiation detector device that includes sulfur hexafluoride (SF$_6$) at 1 atm, as vibration increases. The plot shows an average background of 52.9 cps and an average of 52.1 cps under vibration. The plot demonstrates that the average counts per second was less than approximately 116.0% of the average background when vibrational frequencies from 50 Hz to 1000 Hz were applied to the radiation detector device. For instance, the plot shown in FIG. 4 illustrates that the average counts per second did not increase due to vibration from 50 Hz to 1000 Hz, when the radiation detector device includes the dielectric gas. Additionally, the average counts per second under vibration was within approximately 2.0% of the average background.

Moreover, the counts per second at vibrational frequencies greater than approximately 780 Hz did not remain higher than the average background or the average counts per second from 50 Hz to 1000 Hz. Rather, the photon counter recorded at least one counts per second value that was less than approximately 116.0% of the average background value. Further, counts per second do not experience the deviation shown in FIG. 3, when the vibrational frequency is within a certain range of a resonance frequency of the radiation detector device, such as from 950 Hz to 1000 Hz. As shown, counts per second at approximately 975 Hz are less than 200% of the average background and less than 150% of the overall average counts per second. In fact, the plot shown in FIG. 4 demonstrates that counts per second were within 10% of the average background and the overall average counts per second when vibrational frequency applied to the radiation detector was between 950 Hz and 1000 Hz.

Figure 5:
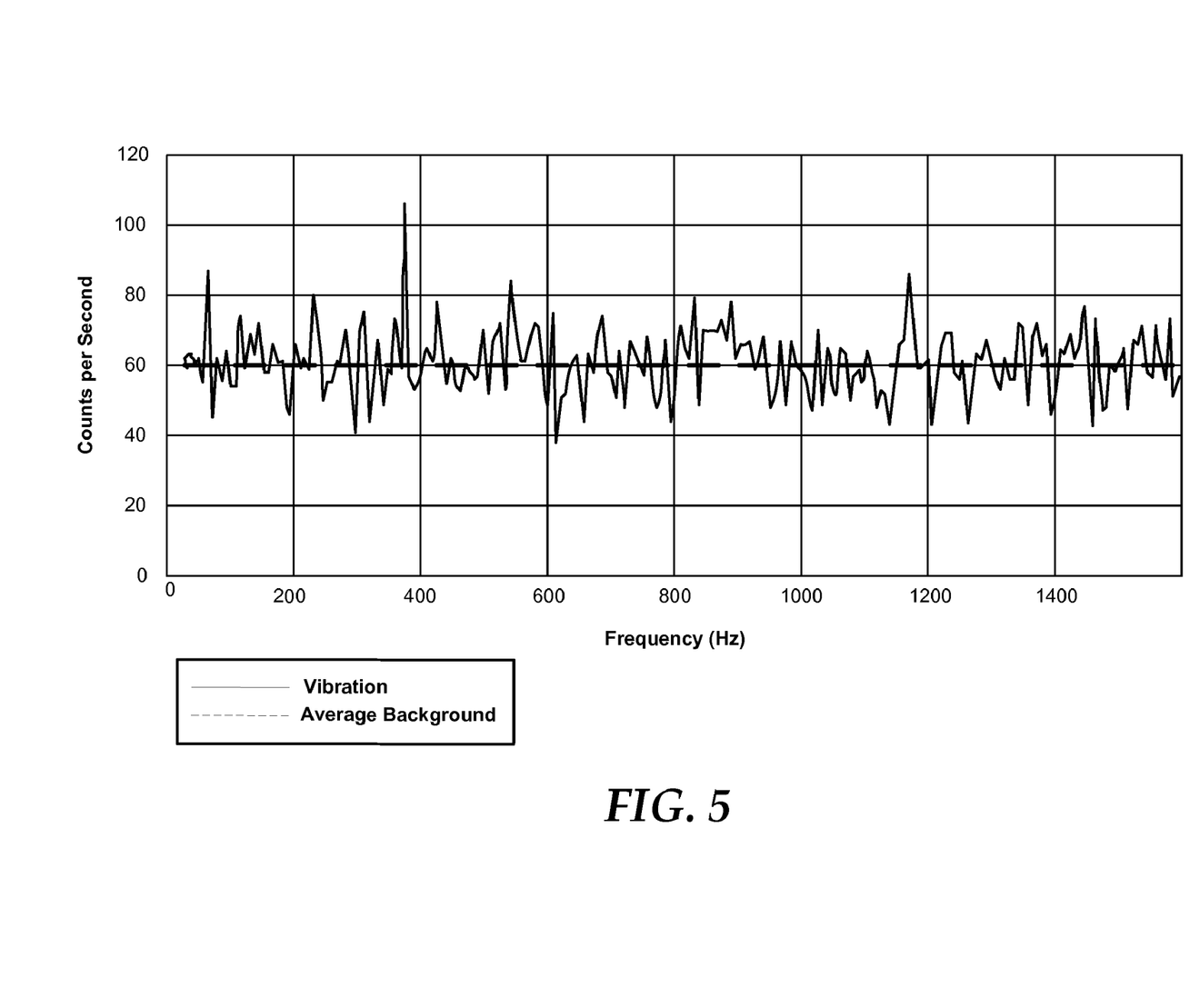
FIG. 5 is a third plot illustrating numbers of counts recorded by a radiation detector device as vibration increases.

FIG. 5 is a third plot illustrating photon counts recorded by a photon counter in a radiation detector device that includes sulfur hexafluoride (SF$_6$) at 1 atm, as vibration increases. The plot demonstrates that counts per second at vibrational frequencies from approximately 1100 Hz to approximately 1500 Hz are less than 150% of the average background. In fact, the plot shown in FIG. 5 demonstrates that counts per second were within 33% of the average background when vibrational frequency applied to the radiation detector was between 1100 Hz and 1500 Hz. In addition, a peak counts per second value when vibrational frequencies of from 50 Hz to 1450 Hz were applied to the radiation detector was less than 200% of the average background value.

Prior art in the field of scintillation devices recognizes that static electricity may develop due to relative movement between scintillator crystals and other elements of a scintillation device. (See, e.g., K. Kimmich, C. Grodsinsky, "Characterizing, Simulating, and Eliminating Vibration Induced Counts in Measurement While Drilling Gamma Ray Detectors," *Applied Radiation and Isotopes*, Vol. 48, Iss. 10-12, October-December 1997, pp. 1385-1390). Conventional solutions to static discharge include attempts to better stabilize the scintillator crystal with respect to other elements of the scintillation device, by placing greater compressive forces on the crystal, the other elements, or a combination thereof. Other approaches attempt to prevent static discharge by placing silicone grease or oil between elements of the scintillator device.

Use of dielectric gases to prevent or reduce static discharge has the added benefit of allowing lower forces to be applied to springs or other stabilization mechanisms that hold the scintillator crystal in place, as relative movement between the scintillator crystal and other elements of the scintillation device due to vibration and shock need not be prevented altogether. For instance, a force of less than 150 pounds per square inch (psi), such as a force of 100 psi or, more preferably, a force of from approximately 20 psi to approximately 60 psi, can be applied to the scintillator crystal to hold it substantially in position; whereas, a force of greater than 150 psi, such as a force of 200 psi, can be required to reduce static discharge by attempting to immobilize the crystal. Application of lower forces to the scintillator crystal can reduce scintillator crystal deformity and breakage, allow the use of larger scintillator crystals, make assembly of the scintillation device easier, and contribute to other advantages. In addition, springs and other stabilization mechanisms can fail as G-load increases. For instance, springs can begin to fail once G-load surpasses 30 G, such as in a 40 G-50 G range. Further, dielectric gases do not present problems of leakage, containment, bubbling or degradation seen with the use of silicone oil or grease, particularly at high temperatures.

The illustrations of the embodiments described herein are intended to provide a general understanding of the structure of the various embodiments. The illustrations are not intended to serve as a complete description of all of the elements and features of the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the Figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A radiation detector device, comprising:
    a photosensor; and
    a scintillation device coupled to the photosensor, the scintillation device including:
        a scintillator crystal enclosed within a casing, the scintillator crystal optically coupled to a window at an end of the casing, and
        a dielectric gas inside at least part of the casing, wherein the dielectric gas is adapted to reduce or prevent static discharge within the scintillation device, and wherein the dielectric gas is characterized by a dielectric strength of at least 4 kV/mm.

2. The radiation detector device of claim 1, wherein the dielectric gas includes at least one gas characterized by a dielectric strength of at least 6 kV/mm at one atmosphere.

3. The radiation detector device of claim 1, wherein the dielectric gas includes at least one gas characterized by a dielectric strength of at least 8 kV/mm at one atmosphere.

4. The radiation detector device of claim 1, wherein the dielectric gas includes at least one gas characterized by a dielectric strength of at least 4 kV/mm at a pressure greater than one atmosphere.

5. The radiation detector device of claim 1, wherein the dielectric gas comprises sulfur hexafluoride ($SF_6$), hexafluoroethane ($C_2F_6$), dichlorodifluoromethane ($CCl_2F_2$), 1,2-dichlorotetrafluoroethane ($C_2Cl_2F_4$) perfluoro-2-butyne ($C_4F_6$), perfluorobutene-2 ($C_4F_8$), perfluorocyclobutane (c-$C_4F_8$), perfluorocyclopentene ($C_5F_8$), perfluorocyclohexene ($C_6F_{10}$), perfluorodimethyl-cylcobutane ($C_6F_{12}$), sulfuryl fluoride ($SO_2F_2$), perchloryl fluoride ($ClO_3F$), or any combination thereof.

6. The radiation detector device of claim 5, wherein the dielectric gas is mixed with air, carbon dioxide, nitrogen, or any combination thereof.

7. The radiation detector device of claim 1, wherein a stabilization force of less than 150 pounds per square inch is applied to the scintillator crystal.

8. The radiation detector device of claim 7, wherein a stabilization force of less than 100 pounds per square inch is applied to the scintillator crystal.

9. The radiation detector device of claim 7, wherein a stabilization force of from approximately 20 to approximately 60 pounds per square inch is applied to the scintillator crystal.

10. The radiation detector device of claim 1, further comprising a photon counter device adapted to count photons emitted by the scintillator crystal based on electrical pulses received from the photosensor, the electrical pulses output by the photosensor based on photons received at the photosensor from the scintillation device.

11. The radiation detector device of claim 10, wherein a peak counts per second value recorded by the photon counter, when vibrational frequencies of from 50 Hz to 1450 Hz are applied to the radiation detector device, is less than 200% of an average background value.

12. The radiation detector device of claim 10, wherein counts per second recorded by the photon counter, when vibrational frequencies of from 50 Hz to 1000 Hz are applied to the radiation detector device, average less than or equal to approximately 116.0% of an average background value.

13. The radiation detector device of claim 10, wherein counts per second recorded by the photon counter, when vibrational frequencies greater than 780 Hz are applied to the radiation detector device, include at least one counts per second value less than or equal to approximately 116.0% of an average background value.

14. The radiation detector device of claim 10, wherein counts per second recorded by the photon counter, when vibrational frequencies of from 50 Hz to 1000 Hz are applied to the radiation detector device, average within approximately 2.0% of an average background value.

15. The radiation detector device of claim 10, wherein counts per second recorded by the photon counter, when vibrational frequencies applied to the radiation detector device are within a range of a resonance frequency of the radiation detector device, are less than 200% of an average background value.

16. The radiation detector device of claim 15, wherein counts per second recorded by the photon counter, when vibrational frequencies applied to the radiation detector device are within a range of a resonance frequency of the radiation detector device, do not vary from the average background value by more than approximately 10.0%.

17. The radiation detector device of claim 15, wherein the resonance frequency is approximately 975 Hz.

18. The radiation detector device of claim 15, wherein the range is from 950 Hz to 1000 Hz.

19. The radiation detector device of claim 10, wherein counts per second recorded by the photon counter, when vibrational frequencies applied to the radiation detector device are within a range of a resonance frequency of the radiation detector device, are less than 150% of an average counts per second value.

20. The radiation detector device of claim 10, wherein counts per second recorded by the photon counter, when vibrational frequencies applied to the radiation detector device are from approximately 1100 Hz to approximately 1500 Hz, do not vary from an average background value by more than approximately 33%.

21. The radiation detector device of claim 10, wherein counts per second recorded by the photon counter, when vibrational frequencies applied to the radiation detector device are from approximately 1100 Hz to approximately 1500 Hz, are less than 150% of an average background value.

22. The radiation detector device of claim 1, wherein the dielectric gas substantially surrounds the photosensor and wherein the dielectric gas is adapted to reduce or prevent static discharge resulting from movement of the photosensor relative to at least one other element of the radiation detector device.

23. The radiation detector device of claim 22, wherein the at least one other element of the radiation detector device includes a housing of the photosensor, a light pipe, an optical interface, or a combination thereof.

24. A scintillation device, comprising:
a scintillator crystal enclosed within a casing, the scintillator crystal optically coupled to a window at an end of the casing; and
a dielectric gas inside at least part of the casing, wherein the dielectric gas is adapted to reduce or prevent static discharge within the scintillation device, wherein the dielectric gas is characterized by a dielectric strength of at least 4 kV/mm.

25. The scintillation device of claim 24, wherein the static discharge includes static discharge resulting from relative movement between the scintillator crystal and an optical interface, from relative movement between the window and the optical interface, from relative movement between the scintillator crystal and a casing, from relative movement between the scintillator crystal and a reflector, from relative movement between the scintillator crystal and a shock absorber, or any combination thereof.

26. The scintillation device of claim 24, wherein the static discharge includes static discharge resulting from vibration or shock to the scintillation device.

* * * * *

UNITED STATES PATENT AND TRADEMARK OFFICE
CERTIFICATE OF CORRECTION

PATENT NO. : 7,675,040 B2
APPLICATION NO. : 12/108259
DATED : March 9, 2010
INVENTOR(S) : Peter R. Menge et al.

It is certified that error appears in the above-identified patent and that said Letters Patent is hereby corrected as shown below:

Column 8, Line 24, Claim 5, please delete "($C_2Cl_2F_4$" and insert therefor --($C_2Cl_2F_4$)--.

Signed and Sealed this
Twenty-third Day of October, 2012

David J. Kappos
*Director of the United States Patent and Trademark Office*